United States Patent [19]

Blenkers et al.

[11] Patent Number: 4,704,376

[45] Date of Patent: Nov. 3, 1987

[54] CATALYST SYSTEM FOR HIGH-TEMPERATURE (CO)POLYMERIZATION OF ETHYLENE

[75] Inventors: Johannes Blenkers, Beek, Netherlands; Luc M. C. Coosemans, Houthalen, Belgium

[73] Assignee: Stamicarbon B.V., Geleen, Netherlands

[21] Appl. No.: 850,688

[22] Filed: Apr. 11, 1986

[30] Foreign Application Priority Data

Jan. 11, 1986 [NL] Netherlands .................. 8600045

[51] Int. Cl.$^4$ ............................................. C08F 4/64
[52] U.S. Cl. ................................. 502/104; 502/113; 502/110; 526/116
[58] Field of Search ................ 502/104, 113, 110

[56] References Cited

U.S. PATENT DOCUMENTS

| | | | |
|---|---|---|---|
| 3,135,809 | 6/1964 | Bosmajian | 502/103 X |
| 3,766,158 | 10/1973 | Yamaguchi et al. | 502/113 X |
| 3,899,477 | 8/1975 | Altemore et al. | 502/113 X |
| 4,151,337 | 4/1979 | Kanoh et al. | 502/113 X |
| 4,483,938 | 11/1984 | Rees | 502/113 |
| 4,547,473 | 10/1983 | Hamilton et al. | 502/113 |

FOREIGN PATENT DOCUMENTS

| | | |
|---|---|---|
| 0057050 | 6/1982 | European Pat. Off. . |
| 0131420 | 2/1984 | European Pat. Off. . |
| 1934677 | 7/1973 | Fed. Rep. of Germany ...... 502/113 |

*Primary Examiner*—Patrick P. Garvin
*Attorney, Agent, or Firm*—Cushman, Darby & Cushman

[57] ABSTRACT

A catalyst system is disclosed as a combination of at least two components comprising: component A which is one or more titanium compounds and one or more vanadium compounds mixed with one or more organoaluminum compounds in such in amount that the atomic ratio of aluminum to the sum of titanium and vanadium is at least 3; and component B which comprises one or more organoaluminum compounds, wherein one or both of components A and B contain a chloride, and wherein during use such two components are fed, separately or in combination, directly to the reaction vessel in such an amount that the atomic ratio of the chlorine from components A and/or B to the sum of titanium and vanadium of component A is at least 6. The catalyst system is suitable for copolymerizing ethylene and optionally minor amounts of 1-alkenes and/or dienes at high polymerization temperatures.

30 Claims, No Drawings

CATALYST SYSTEM FOR HIGH-TEMPERATURE (CO)POLYMERIZATION OF ETHYLENE

FIELD OF THE INVENTION

The invention relates to a catalyst system for the (co)polymerization of ethylene and optionally minor amounts of 1-alkenes and/or dienes, to the preparation of this catalyst system and to the (co)polymerization of ethylene and optionally minor amounts of 1-alkenes and/or dienes.

BACKGROUND OF THE PRESENT INVENTION

There are numerous catalyst systems that are capable of bringing about polymerization of ethylene and/or 1-alkenes. Thus, for instance, so-called Phillips and Ziegler-Natta systems can be distinguished. Of these, a number relate to polymerization in the gas phase. Others aim at polymerization in the presence of a liquid dispersant. The latter can be subdivided into the so-called suspension system, with polymerization taking place at temperatures that are below the temperature at which polyethylene dissolves, and the so-called solution system, with a polymerization temperature that is higher than the temperature at which the formed polyethylene dissolves. Solution polymerization requires special catalyst systems as the catalyst activity and the molecular weight of the produced polymer generally decrease with increasing polymerization temperature. It was not until the end of the sixties that a catalyst was developed the activity of which was such that solution polymerization of ethylene could be effected without having to remove catalyst residues from the product (GB-A No. 1,235,062).

In general, polymerization takes place at temperatures that are only little above the temperature at which polyethylene dissolves, because the activity of catalysts customarily applied so far decreases at high polymerization temperatures. At unchanged residence time, this means that the polymer yield decreases, as a result of which the amounts of catalyst residues in the polymer increase and it soon becomes necessary to wash out the polymer. A problem in this exothermic polymerization reaction is the dissipation of the heat of polymerization. Cooling through the wall or by cooling devices in the reactor may easily lead to polymer deposition on the cooling surfaces, especially at cooling agent temperatures below 150° C. For this reason, strong cooling of the reactor feed was preferred. This, however, costs much energy and will become more expensive as fuel prices rise.

Polymerization at high temperatures would entail energy advantages also in another respect: not only can the strong cooling of the reactor feed be reduced or even be done without, in addition there no longer is any need to heat the product during processing of the polymer in order to evaporate the solvent. The reason for this is that the heat of evaporation decreases or even becomes zero as the solution temperature is higher and approaches or even reaches or exceeds the critical temperature of the solvent, and as a result the enthalpy of evaporation becomes minimal.

For the above reasons there is much demand for high-temperature catalysts. These catalysts should be so active as to retain sufficient activity also at very high polymerization temperatures (in excess of 180° C.). This requirement is rendered even more severe by modern legislation, which imposes clear-cut limits as regards the concentration of transition metals in products. Moreover, the polymer produced is to meet the customary requirements as regards processability and applicability, which implies the molecular weight must be sufficiently high, or the melt index sufficiently low.

European patent applications EP-A No. 57050 and EP-A No. 131 420 describe catalyst systems that are active at very high polymerization temperatures.

The catalyst system of EP-A 57050 comprises the combination of two components, the first of which is prepared by heeating an organoaluminium compound, titanium tetrahalide and, optionally, vanadium oxytrihalide for at least 5 seconds to at least 150° C., and the second of which is an organoaluminium compound. In EP-A No. 131 420 the first component is the same as in EP-A No. 57050, while the second is an alkyl siloxalane. The various components of these catalyst systems are mixed such that in the first component the atomic ratio of aluminium to titanium plus vanadium is between 0.2 and 2.0, and preferably more titanium than vanadium is present. The optimum titanium:vanadium ratio is 85:15. The atomic ratio of the aluminium from the second component to titanium plus vanadium is at most 3.

A disadvantage of these catalysts is that heating of the first component or a portion thereof prior to combination with the second component requires extra energy and is laborious. For industrial-scale polymerization, streamlining of the process is of prime importance. Intermediate heating of a portion of the catalyst system would interfere with this objective. In addition, a precipitate is formed on such heating, which may result in problems with the catalyst feed to the reactor.

DESCRIPTION AND OBJECTS OF THE PRESENT INVENTION

The invention aims to find a catalyst system not having the above-mentioned disadvantages without sacrificing activity or the capability of forming large polymer molecules at very high polymerization temperatures.

It has, surprisingly, been found that a catalyst system that is a combination of at least two components, A and B, which components comprise:

A: one or more titanium compounds and one or more vanadium compounds, mixed with one or more organoaluminium compounds in such an amount that the atomic ratio of aluminium to the sum of titanium and vanadium is at least 3, B: one or more organoaluminium compounds, one or both of components A and B containing a chloride, and which two components are fed, separately or in combination, direct to the reaction vessel in such an amount that the atomic ratio of the chlorine from components A and/or B to the sum of titanium and vanadium of component A is at least 6, is suitable for (co)polymerization of ethylene and optionally minor amounts of 1-alkenes and/or dienes at very high polymerization temperatures.

An advantage of a catalyst system according to the invention is that very high temperatures can be used to produce polyethylene that meets the customary requirements as regards processability and applicability and that contains such a small amount of catalyst residues that washing out of the product is not necessary.

The catalysts according to the present invention not only are very active, but also very rapid, so that very short residence times will suffice. A short residence time has the great advantage that a small reactor may be used. Thus, in a 5 m³ reactor an annual production of more than 50,000 ton can be reached when using the catalysts according to the invention.

Using the subject catalysts, residence times of 10 minutes or less will suffice. At residence times of 5 minutes the yields still are so high that no treatment for washing out the catalyst residues need be applied.

Yet another advantage is that components A and B are fed direct to the reaction vessel, that is, without further heating above 150° C. or recovery of a precipitate. Such additional operations even have an adverse effect on the catalyst system according to the invention.

The residence time of the various catalyst components in the feed lines on the whole is sufficient for obtaining an active catalyst system. In most cases this residence time will not be more than some, for instance 5, minutes; often it will even be less, for instance less than 3 or even less than 1 minute.

However, a longer residence time, though economically unattractive, in itself is not disadvantageous for the catalyst according to the invention. If for certain reasons it should be desirable to allow the combined catalyst components to stand for some time, for instance in the case of batch-wise polymerization, this does not entail a reduction of activity.

Catalysts that are built up of two components are described in for instance, DE-A No. 2600366 and DE-A No. 1934677. In both of these patent applications the component containing transition metals is prepared via complicated intermediate steps, after wich the precipitate formed is recovered and thoroughly washed. These catalysts are intended for suspension polymerization and they are hardly active at polymerization temperatures in excess of 180° C. The polymers produced using these catalysts, in addition, have such a high transition metal content as to necessitate washing out of the product. The catalyst systems according to the invention not only take less time to prepare, they also have a higher activity, with all associated advantages.

Catalyst systems according to the invention are most active at an atomic ratio of aluminium from component A to the sum of titanium and vanadium of at least 5. It is to be recommended for the atomic ratio of chlorine to the sum of titanium and vanadium to be at least 7.5, in particular at least 9. A further increase in activity is achieved at an atomic ratio of aluminium from component B to the sum of titanium and vanadium of at least 3. Further, an atomic ratio of titanium to vanadium of at most 1, and in particular of at most 0.8, is to be preferred. As titanium compounds, both trivalent and tetravalent compounds of the general formula Ti-$(OR^1)_{4-n}X^1_n$ and Ti$(OR^2)_{3-m}X^2_m$, respectively, in which $R^1$ and $R^2$ are equal or different and represent hydrocarbon residues with 1-20 carbon atoms, $X^1$ and $X^2$ halogen atoms, $0<n<4$ and $0<m<3$, yield good results. Of these compounds, titanic acid esters such as tetrabutoxytitanium are to be preferred. Titanium complexes such as, for instance, TiCl₃.3 decanol, TBT.AlCl₃, TBT.0.2 Cr(acac)₂, TBT.x CrO₃ and TBT.x diethylzinc ($0<X<1$) can also be applied. (See list of abbreviations on p. 11).

Likewise, use can be made of compounds such as, for instance, cresyl titanate polymer (CH₃C₆H₄[Ti(OC₆H₄CH₃)₂O]$_a$C₆H₄CH₃, a>1).

As vanadium compounds, use can be made of compounds of the general formula VO(OR³)$_{3-p}$X³$_p$, where R³ represents a hydrocarbon residue with 1-20 carbon atoms, X³ a halogen atom, and $0<p<3$, in particular vanadyl chloride and/or vanadyl butoxide. It is also possible to use vanadium compounds of the general formula VX⁴₃ or VX⁴₄, where X⁴ represents a halogen atom. X⁴ preferably is a chlorine atom. Mixtures of titanium compounds or vanadium compounds can also be used as catalyst ingredients. The role played by chloride in this complicated catalyst system is not quite clear. Optionally a predominant portion of the chlorine atoms originates from component B, but it has been found that the catalyst yields better results when at least half of the total amount of chlorine atoms present originates from component A. For this reason, it is to be recommended that component A also comprises one or more chlorides. These are, for instance, alkyl chlorides, acyl chlorides, aryl chlorides, inorganic chlorides, or combinations thereof. Preference is to be given to isopropyl chloride, benzyl chloride and/or chlorides of elements of the groups 3a and 4a of the Periodic System (Handbook of Chemistry and Physics, 52nd ed.), in particular SiCl₄ and BCl₃. An active catalyst yielding a high polymer molecular weight, also at very high polymerization temperatures, is also formed when component A furthermore comprises one or more electron donors (Lewis bases) such as, for instance, DEA, EB, IPA, acetyl acetone and/or MPT. (Reference is made to the list of abbreviations used, which is given on page 11).

The organoaluminium compound of component A may be chosen from a large group of compounds, including alkyl siloxalanes. Preference is given to an organo-aluminium compound having the general formula $R^4_qAlX^5_{3-q}$, where the symbols $R^4$ are equal or different and represent a hydrocarbon residue with 1-20 carbon atoms, in particular alkyl, $X^5$ represents a halogen atom, in particular chlorine, and $0<q<3$. Mixtures may also be applied. When applying, for instance, trialkyl aluminium compounds it is recommendable to increase the chlorine content of component A by addition of a chloride and/or by selecting the titanium and/or vanadium compounds such that these can serve as chlorine source.

Examples of organoaluminium compounds of component A are DADHMS, DADS, DEAC, MEAC, MMAC, SEAC, SMAC, TEA, TIBA, TMA. In particular DEAC and/or SEAC yield good results. (See list of abbreviations on page 11).

The organoaluminium compound of component B may be the same as that of component A, but this need not be so. A good result is obtained when applying compounds with the general formula $R^5_sAlY_{3-s}$, where the symbols $R^5$ are equal or different and represent a hydrocarbon residue with 1-20 carbon atoms, Y represents a hydrogen atom, a hydrocarbon residue with 1-20 carbon atoms, a group having the general formula —NR⁶ (where R⁶ is a hydrocarbon residue with 1-20 carbon atoms), or a group having the general formula —OR⁷ (where R⁷ is a hydrocarbon residue with 1-20 carbon atoms or a group having the general formula —Si(R⁸)₃, where the symbols R⁸ are equal or different and represent a hydrogen atom and/or a hydrocarbon residue with 1-20 carbon atoms), and $0<s<3$.

In particular compounds with an aluminium-oxygen bond have a good activity. In addition, an alkyl aluminoxane (a compound of the general formula R₂Al—[OAl(R)]$_b$—OAlR₂, where the symbols R are equal or different and represent a hydrocarbon residue with 1-10 carbon atoms, and b>0) can also be applied as component B with good results. Mixtures may also yield good results.

A further increase in activity is achieved if, besides the organoaluminium compound(s), one or more other metal alkyls are added to component B such as, for instance, dialkyl magnesium-, dialkyl zinc-, trialkylboron-, alkyl lithium compounds. Examples of organoaluminium compounds of component B are: methylaluminoxane, DADHMS, DADS, DATPS, DEAC, DEAH, DEALOX, IPRA, MEAC, SEAC, TEA, TIBA, TIBAO, DIBBA, DIBAH, TOA. (See the list of abbreviations on page 11). Good results are obtained especially when component B in addition comprises one or more electron donors (Lewis bases) such as EB, IPA, MPT, decanol, PMHS.

If desired, a chloride may also be added to component B.

Catalyst systems according to the reactor may be fed to the reactor separately or in combination. However, a better result is obtained when components A and B are separately fed to the reactor. When components A and B are fed separately to the reactor, it is immaterial in what order this is done. The sequence in which the ingredients of the components themselves are mixed is not very important, either.

As regards component A, for instance, first a titanium and a vanadium compound can be mixed, then an organoaluminium compound can be added and finally, optionally, a chloride and/or an electron donor. The organoaluminium compound may also first be mixed with a chloride and subsequently with a titanium and a vanadium compound. It is also possible to add the organoaluminium compound to one of the transition metal compounds before the seed transition metal compound is added. It may be preferable to mix the vanadium and titanium compounds in advance, especially when on of them is less stable, such as VOCl$_3$.

It is recommendable to mix the transition metal compounds with the organoaluminium compound at a temperature below 125° C., in particular below 75° C., more in particular below 50° C. In general the temperature will not be below −60° C.

As regards component B, here too the sequence of mixing, if any, can freely be determined, without the giving rise to a significant deterioration of catalyst activity.

It can be said for both component A and component B that the presence of absence of monomer(s) during mixing of the catalyst ingredients have little effect on the catalyst activity.

It is also possible to feed a third component to the reactor besides components A and B. This third component may be a chloride and/or electron donor, in particular a chloride or aryl or alkyl or an element of groups 3a and 4a of the Periodic System, or an organoaluminium chloride.

The invention also relates to polymers obtained by means of a catalyst according to the invention. These polymers comprise ethylene, one or more 1-alkenes with 3 to 18 carbon atoms in an amount of 0 to 15 mole.% relative to the total polymer, and one or more dienes with at least 7 carbon atoms in an amount of 0 to 10 mole.% relative to the total polymer. In particular polymers in which the dienes contain at least two nonconjugated double bonds capable of being polymerized by means of transition metal catalysts, and in which the amount of dienes does not exceed 0.1 mole.% relative to the total polymer, have good properties.

Polymers according to the invention may contain the customary additives, such as stabilizers, lubricants, etc., and also, for instance, crosslinking agents and fillers.

Polymers obtained by means of a catalyst according to the invention possess the customary properties that are commercially desired, such as a sufficiently high molecular weight (low melt index) and good processability. They can be used for the preparation of cast film and blown film having good mechanical and optical properties, while also the rheological and welding properties meet the normal requirements. The polymers are also suitable for many other customary applications, e.g. injection moulding and rotational moulding.

Polymerization can be effected in a manner known in itself, both batchwise and continuous. In general the catalyst components, prepared in advance, are added in such amounts that the amount of titanium in the polymerization medium is 0.001 to 4 mmol/l, preferably 0.005 to 0.5 mmol/l, and more in particular 0.01 to 0.05 mmol/l.

As dispersing agent, both in the catalyst preparation and in the polymerization, use can be made of any liquid that is inert relative to the catalyst system, for instance one or more saturated, straight or branched aliphatic hydrocarbons, such as butanes, pentanes, hexanes, heptanes, pentamethylheptane or petroleum fractions such as light or regular-grade petrol, isopar, naphtha, kerosine, gas oil. Aromatic hydrocarbons, for instance benzene or toluene, can be used, but both because of the cost price and for safety considerations such solvents will generally not be applied in technical-scale production. By preference, therefore, in technical-scale polymerizations as solvent use is made of the cheap aliphatic hydrocarbons or mixtures thereof, as marketed by the petrochemical industry. Pretreatment of such solvents, for instance drying or purification, is often required. This will present no problems whatsoever to the average person skilled in the art. Cyclic hydrocarbons, such as cyclohexane, can of course also be used as solvent.

By preference the polymerization is effected at temperatures above 180° C., especially above 200° C., and more in particular at temperatures above 220° C. For practical considerations the temperature will generally not be higher than 300° C.

The polymer solution obtained upon polymerization can subsequently be recovered in a way known in itself, the catalyst generally being deactivated at some stage of the recovery. Deactivation can be effected in a way known in itself. The catalysts according to the present invention are so active that the amount of catalyst in the polymer, notably the transition metal content, is so low that removal of catalyst residues can be done without. Of course the polymer can be subjected to a washing treatment so as to further reduce the residual content of catalyst components, if this is deemed necessary.

Polymerization can be effected under atmospheric pressure, but also at elevated pressure, up to about 1000 bar, or even higher, both in continuous and in discontinuous manner. By effecting the polymerization under pressure, the polymer yield can be increased further, which may contribute to the preparation of a polymer having very low contents of catalyst residues. It is preferred to polymerize at pressures of 1–200 bar, and more in particular of 10–100 bar.

Pressures in excess of 100 bar soon give rise to technological objections. Much higher pressures, of 1000 bar and more, can however be used if polymerization is effected in so-called high-pressure reactors.

In the subject process modifications known in itself can be applied. Thus, for instance, the molecular weight can be controlled by addition of hydrogen or other customary modifying agents. Polymerization can also be effected in various stages, connected either in parallel or in series, in which, if desired, differing catalyst compositions, temperatures, residence times, pressures, hydrogen concentrations, etc. are applied. Products with a broad molecular weight distribution, for instance, can be prepared by selecting the conditions in one stage, for instance pressure, temperature and hydrogen concentration, such that a polymer with a high molecular weight is formed, while the conditions in another stage are selected such that a polymer with a lower molecular weight is formed.

The invention will now be elucidated with reference to some examples, without, however, being restricted thereto.

| List of abbreviations used: | |
|---|---|
| Acac = | acetyl acetonate |
| Alox = | methylaluminoxane |
| BP = | benzophenone |
| BzCl = | benzyl chloride |
| DADHMS = | diethylaluminium dihydromethylsiloxide |
| DADS = | diethylaluminiumdimethylethylsiloxide |
| DATPS = | diethylaluminium triphenylsiloxide |
| DEA = | diethylamine |
| DEAC = | diethylaluminium chloride |
| DEAH = | diethylaluminium hydride |
| DEALOX = | diethylaluminium ethoxide |
| DEZ = | diethylzinc |
| DPDMS = | diphenyldimethoxysilane |
| DIBAH = | diisobutylaluminium hydride |
| DIBBA = | diisobutyl-1-buten-1-ylaluminium |
| EB = | ethyl benzoate |
| EN = | ethylenediamine |
| IPA = | isopropyl alcohol |
| IPCl = | isopropyl chloride |
| IPRA = | isoprenyl aluminium |
| MEAC = | monoethyl aluminiumdichloride |
| MMAC = | monomethyl aluminiumdichloride |
| MPT = | methylparatoluate |
| PMHS = | polymethylhydrosiloxane |
| SEAC = | sesquiethylaluminiumchloride (ethyl$_{1,5}$AlCl$_{1,5}$) |
| SMAC = | sesquimethylaluminium chloride (methyl$_{1,5}$AlCl$_{1,5}$) |
| TBOT = | tributoxyoleyltitanate |
| TBT = | tetrabutoxytitanium |

| List of abbreviations used: | |
|---|---|
| TEA = | triethylaluminium |
| TEB = | triethyl boron |
| TPS = | triphenylsilanol |
| TIBA = | triisobutylaluminium |
| TIBAO = | tetraisobutylaluminoxane |
| TIPT = | tetraisopropoxytitanium |
| TMA = | trimethylaluminium |
| TOA = | trioctylaluminium |
| VB = | vanadyl butoxide |

EXAMPLE I

Polymerization experiments were conducted at 240° C. in a 1-liter gas-liquid reactor with 500 ml purified and dried pentamethylheptane (PMH) as dispersing agent and ethylene to a reactor pressure of 17 bar. The ingredients of the catalyst components were separately premixed in PMH at 25° C. during 1 minute, and subsequently the catalyst components were separately pumped into the reactor (unless indicated otherwise). Table 1 shows the sequence in which the ingredients of the catalyst components were mixed and in what concentration they were present during polymerization (in mmol/l). The polymerization time was 10 minutes. The polymer was stabilized, if necessary, dried and weighed. The result was expressed in g polymer per mmol titanium + vanadium. The activity $\alpha$ of the catalyst system is expressed as g PE/mmol (Ti+V). 10 min.

The index (M.I.) of the polymer, expressed in dg/min, is determined in accordance with ASTM D 1238, cond. E.

EXAMPLE II

The catalyst components were mixed as indicated in Table 2. The catalyst preparation and the polymerization were effected in the same way as in Example I, now however at a reactor pressure of 8 bar.

Notes in the tables:
(1) Component B was first fed to the reactor, then component A.
(2) Components A and B were mixed prior to being fed to the reactor.
(3) Et stands for ethyl.

TABLE 1

| Exp. No. | COMPONENT A | COMPONENT B | α | M.I. |
|---|---|---|---|---|
| 1 | 0.6 SEAC/0.04 TBT/0.06 VB | 0.4 TEA | 1162 | 7.1 |
| 2 | 0.5 SEAC/0.04 TBT/(0.06 VCl$_3$.decanol) | 0.4 DEALOX | 1335 | 8.8 |
| 3 | 0.6 SEAC/0.04 TBT/(0.06 VCl$_3$.decanol) | 0.4 DEALOX | 1351 | 8.0 |
| 4 | 0.6 DEAC/0.6 TPS/(0.04 TBT + 0.06 VOCl$_3$) | 0.4 TEA | 907 | 5.5 |
| 5 | 0.45 DEAC/0.45 TPS/(0.04 TBT + 0.06 VOCl$_3$) | 0.55 DEAC | 1088 | 8.6 |
| 6 | 0.5 SEAC/(0.04 TBT + 0.06 VOCl$_3$) | 0.4 DADS | 1253 | 8.4 |
| 7 | 0.7 SEAC/0.04 TBT/0.06 VB | 0.3 DADS/0.1 TEB | 1507 | 10.6 |
| 8 | 0.6 SEAC/0.04 TBT/0.06 VB | 0.4 TEA/0.2 EB | 1178 | 4.8 |
| 9 | 0.7 SEAC/(0.04 TBT + 0.06 VOCl$_3$) | 0.4 DADS/0.2 decanol | 1596 | 12.7 |
| 10 | 0.8 SEAC/(0.04 TBT + 0.06 VOCl$_3$) | 0.4 DADS/0.4 decanol | 1766 | 16.4 |
| 11 | 0.7 SEAC/(0.04 TBT + 0.06 VOCl$_3$) | 0.4 DADS/0.4 IPA | 1568 | 7.5 |
| 12 | 0.7 SEAC/(0.04 TBT + 0.06 VOCl$_3$) | 0.4 DADS/0.4 PMHS | 1686 | 9.8 |
| 13 | 0.7 SEAC/(0.04 TBT + 0.06 VOCl$_3$) | 0.4 DADS/0.1 TEB/0.3 IPA | 1573 | 8.8 |
| 14[1] | 0.6 SEAC/0.04 TBT/0.06 VB | 0.4 TEA/0.2 EB/0.2 BzCl | 1068 | 5.2 |
| 15 | 0.6 SEAC/0.04 TBT/0.06 VB/0.2 BzCl | 0.4 TEA | 1107 | 4.9 |
| 16 | 0.6 SEAC/0.04 TBT.0.08 CrO$_3$/0.06 VB/0.2 BzCl | 0.4 TEA | 1045 | 4.0 |
| 17 | 0.6 SEAC/0.04 TBOT/0.06 VB/0.2 BzCl | 0.4 TEA | 1100 | 4.5 |
| 18 | 0.3 SEAC/0.04 TBT/0.06 VB/0.2 BzCl | 0.4 DADS | 850 | 7.6 |
| 19 | 0.6 SEAC/0.01 TBT/0.09 VB/0.2 BzCl | 0.4 DADS | 1147 | 7.0 |
| 20 | 0.6 SEAC/0.03 TBT/0.07 VB/0.2 BzCl | 0.4 DADS | 1204 | 9.0 |
| 21 | 0.6 SEAC/0.04 TBT/0.06 VB/0.2 BzCl | 0.4 DADS | 1263 | 6.6 |
| 22 | 0.6 SEAC/0.05 TBT/0.05 VB/0.2 BzCl | 0.4 DADS | 919 | 7.0 |
| 23 | 0.6 SEAC/0.07 TBT/0.03 VB/0.2 BzCl | 0.4 DADS | 888 | 4.4 |
| 24 | 0.6 SEAC/0.09 TBT/0.01 VB/0.2 BzCl | 0.4 DADS | 570 | — |
| 25 | 0.6 SEAC/0.04 TBT.ALCl$_3$/0.06 VB/0.2 BzCl | 0.4 DADS | 1182 | 5.4 |

TABLE 1-continued

| Exp. No. | COMPONENT A | COMPONENT B | α | M.I. |
|---|---|---|---|---|
| 26 | 0.6 SEAC/0.04 TIPT/0.06 VB/0.2 BzCl | 0.4 DADS | 1294 | 7.5 |
| 27 | 0.6 SEAC/0.04 TBT/0.06 VB/0.2 BzCl | 0.4 DEALOX | 1214 | 4.7 |
| 28 | 0.6 SEAC/0.04 TIPT/0.06 VB/0.2 BzCl | 0.4 TIBAO | 1223 | 6.8 |
| 29 | 0.6 SEAC/0.04 TBT/0.06 VB/0.2 BzCl | 0.4 ALox | 1080 | 4.4 |
| 30 | 0.6 SEAC/0.04 TBT/0.06 VB/0.2 BzCl | 0.4 TIBA | 1175 | 4.7 |
| 31 | 0.6 SEAC/0.04 TBT/0.06 VB/0.2 BzCl | 0.4 DIBAH | 1100 | 5.6 |
| 32 | 0.6 SEAC/0.04 TBT/0.06 VB/0.1 $SnCl_4$ | 0.4 DEALOX | 1382 | 5.1 |
| 33 | 0.6 SEAC/0.04 TBT/0.06 VB/0.2 $SiCl_4$ | 0.4 DADS | 1391 | 8.6 |
| 34 | 0.6 SEAC/0.04 TBT/0.06 VB/0.06 $SnCl_4$ | 0.4 DADS | 1373 | 7.6 |
| 35 | 0.6 SEAC/0.04 TBT/0.06 VB/0.1 $BCl_3$ | 0.4 DADS | 1264 | 6.3 |
| 36 | 0.6 SEAC/0.04 TBT/0.06 VB/0.2 $BCl_3$ | 0.4 DADS | 1286 | 5.9 |
| 37 | 0.6 SEAC/0.04 TBT/0.06 VB/0.2 IPCl | 0.4 TEA | 1116 | 5.3 |
| 38 | 0.6 SEAC/0.2 BzCl/0.04 TBT/0.06 VB | 0.4 TEA | 1181 | 5.0 |
| 39 | 0.6 SEAC/(0.04 TBT + 0.06 $VOCl_3$)/0.1 $BCl_3$ | 0.4 DADS | 1300 | 8.8 |
| 40 | 0.6 SEAC/(0.04 TBT + 0.06 $VOCl_3$)/0.2 $SiCl_4$ | 0.4 DADS | 1326 | 9.3 |
| 41 | 0.6 SEAC/0.04 $TiCl_4$/0.06 $VOCl_3$/0.2 BzCl | 0.4 DADS | 1030 | 4.1 |
| 42 | 0.5 SEAC/0.04 TBT/0.06 $VCl_3.3^3$dekanol/0.2 $SiCl_4$ | 0.4 DEALOX | 1393 | 9.2 |
| 43[2] | 0.6 SEAC/0.04 TBT/0.06 VB/0.2 BzCl | 0.4 DADS | 1301 | 12 |
| 44[2] | 0.6 SEAC/0.04 $TiCl_4$/0.06 $VOCl_3$/0.2 BzCl | 0.4 DADS | 1004 | 7.1 |
| 45 | 0.6 SEAC/0.04 TBT/0.06 VB/0.2 BzCl | 0.2 TEA/0.2 ALox | 1100 | 3.4 |
| 46[3] | 0.6 SEAC/0.04 TBT/0.06 VB/0.2 BzCl | 0.2 TEA/0.2 $Et_2ALNEt_2$ | 990 | 2.6 |
| 47 | 0.6 SEAC/0.04 TBT/0.06 VB/0.2 BzCl | 0.4 TEA/0.2 BP | 1312 | 8.3 |
| 48 | 0.6 SEAC/0.04 TBT/0.06 VB/0.2 BzCl | 0.4 TEA/0.2 EN | 1134 | 3.4 |
| 49 | 0.6 SEAC/0.04 TBT/0.06 VB/0.2 BzCl | 0.4 TEA/0.2 EB | 1412 | 10.5 |
| 50[2] | 0.6 SEAC/0.04 TBT/0.06 VB/0.2 BzCl | 0.4 TEA/0.2 EB | 1472 | 17 |
| 51 | 0.6 SEAC/0.04 TBT/0.06 VB/0.2 $SiCl_4$ | 0.4 TEA/0.2 EB | 1314 | 9.6 |
| 52[2] | 0.6 SEAC/0.04 TBT/0.06 VB/0.2 $SiCl_4$ | 0.4 TEA/0.2 EB | 1398 | 12.3 |
| 53 | 0.6 SEAC/0.04 TBT/0.06 VB/0.2 IPCl | 0.4 TEA/0.2 EB | 1291 | 7.5 |
| 54 | 0.6 SEAC/0.04 TBT/0.06 VB/0.2 BzCl | 0.4 TEA/0.2 DPDMS | 1188 | 5.1 |
| 55 | 0.6 SEAC/0.04 TBT/0.06 VB/0.2 BzCl | 0.4 TEA/0.4 decanol | 1296 | 7.3 |
| 56 | 0.6 SEAC/0.04 TBT/0.06 VB/0.2 BzCl | 0.4 TEA/0.4 decanol | 1265 | 5.0 |
| 57 | 0.7 SEAC/0.04 TBT/0.06 VB/0.2 BzCl | 0.4 DADS/0.2 IPA | 1516 | 12.1 |
| 58 | 0.7 SEAC/0.04 TBT/0.06 VB/0.2 $SiCl_4$ | 0.4 DADS/0.2 IPA | 1644 | 14.1 |
| 59 | 0.6 SEAC/0.04 TBT/0.06 VB/0.2 BzCl | 0.4 IPRA/0.2 decanol | 1008 | 1.9 |
| 60 | 0.6 SEAC/0.04 TBT/0.06 VB/0.2 BzCl | 0.4 DIBAH/0.4 decanol | 1210 | 8.7 |
| 61 | 0.6 SEAC/0.04 TBT/0.06 VB/0.2 BzCl | 0.4 DIBBA/0.2 decanol | 1208 | 6.3 |
| 62 | 0.6 SEAC/0.04 TBT/0.06 VB/0.2 BzCl | 0.4 DIBBA/0.4 decanol | 1144 | 5.9 |
| 63 | 0.45 DEAC/(0.04 TBT + 0.06 $VOCl_3$)/0.2 BzCl | 0.45 DEAC/0.1 TEA/0,4 dekanol | 1118 | 5.5 |
| 64 | 0.6 SEAC/0.04 TBT/0.06 VB/0.1 EB | 0.4 TEA | 886 | 1.9 |
| 65 | 0.7 SEAC/0.04 TBT/0.06 VB/0.1 BzCl/0.1 EB | 0.4 TEA | 1257 | 3.4 |
| 66 | (1.0 DEAC + 0.2 EB)/0.04 TBT/0.06 VB/0.2 BzCl | 0.2 DADS | 966 | 3.4 |

TABLE 2

| Exp. No. | COMPONENT A | COMPONENT B | α | M.I. |
|---|---|---|---|---|
| 1 | 0.6 SEAC/0.04 TBT/0.06 VB | 0.4 TEA | 583 | 1.6 |
| 2 | 0.6 SEAC/(0.04 TBT + 0.06 $VOCl_3$) | 0.4 TEA | 594 | 1.45 |
| 3 | 0.6 SEAC/0.04 $TiCl_4$/0.06 VB | 0.4 TEA | 666 | — |
| 4 | 0.6 SEAC/(0.04 $TiCl_4$ + 0.06 $VOCl_3$) | 0.4 TEA | 507 | 1.3 |
| 5 | 0.6 SEAC/0.04 TBT/0.06 VB | 0.4 DADS | 574 | 0.8 |
| 6 | 0.6 SEAC/(0.04 TBT + 0.06 $VOCl_3$) | 0.4 DADS | 722 | 1.2 |
| 7 | 0.5 SEAC/(0.04 $TiCl_4$ + 0.06 $VOCl_3$) | 0.4 DADS | 637 | 1.0 |
| 8 | 0.6 SEAC/0.04 $TiCl_4$/0.06 VB | 0.4 TIBA | 679 | — |
| 9 | 0.6 SEAC/0.04 TBT/0.06 VB | 0.4 DEALOX | 567 | — |
| 10 | 0.6 SEAC/0.04 $TiCl_4$/0.06 VB | 0.4 DEALOX | 600 | 0.9 |
| 11 | 0.6 SEAC/(0.04 TBT + 0.06 $VOCl_3$) | 0.4 DEALOX | 660 | — |
| 12 | 0.6 SEAC/0.04 TBT/0.06 VB | 0.4 TEA/0,4 ROH | 673 | 1.1 |
| 13 | 0.6 SEAC/0.04 $TiCl_4$/0.06 VB | 0.4 TEA/0,4 ROH | 701 | — |
| 14 | 0.6 SEAC/0.04 TBT/0.06 VB/0.2 BzCl | 0.4 TEA | 623 | — |
| 15 | 0.6 SEAC/0.04 TBT/0.06 VB/0.2 BzCl | 0.4 DEALOX | 747 | 0.95 |
| 16 | 0.6 SEAC/(0.04 TBT + 0.06 $VOCl_3$)/0.2 BzCl | 0.4 DEALOX | 748 | 1.1 |
| 17 | 0.6 SEAC/(0.04 TBT + 0.06 $VOCl_3$)/0.2 BzCl | 0.4 DADS | 704 | 0.8 |
| 18 | 0.6 SEAC/0.04 TBT/0.06 VB/0.2 BzCl | 0.4 TEA/0,4 ROH | 682 | 1.2 |

COMPARATIVE EXAMPLE 1

The catalyst was composed as shown in Table 3, and polymerization was effected as in Example II.

TABLE 3

| Exp. No | Component A | Component B | α | MI |
|---|---|---|---|---|
| 1 | 0.1 DEAC/(0.075 $TiCl_4$ + 0.025 $VOCl_3$) | 0.28 TEA | 374 | 0.46 |
| 2 | 0.1 DEAC/(0.04 $TiCl_4$ + 0.06 $VOCl_3$) | 0.28 TEA | 347 | 0.72 |
| 3 | 0.1 DEAC/(0.075 TBT + 0.025 $VOCl_3$) | 0.28 TEA | <50 | — |
| 4 | 0.2 DEAC/(0.075 TBT + 0.025 $VOCl_3$) | 0.28 TEA | 152 | — |
| 5 | 0.1 DEAC/(0.04 TBT + 0.06 $VOCl_3$) | 0.28 DADS | <50 | — |
| 6 | 0.2 SEAC/0.04 TBT/0.06 VB/0.2 BzCl | 0.4 DADS | <50 | — |

COMPARATIVE EXAMPLE 2

Component A was prepared by stirring 9 mmol TiCl₄ and 9 mmol VB during 2 hours in 10 ml PMH in a glass vessel under nitrogen, the temperature being 60° C. Subsequently 27 mmol SEAC was added dropwise at 20° C., and the mixture was stirred during three hours at 20° C. After decantation, the precipitate was washed 6 times with 40 ml PMH.

Of this suspension such an amount was fed to the reactor that the total concentration of transition metals was about 0.1 mmol/l. Polymerization was further effected as in Example II at 200° C. and 240° C.

The results are presented in Table 4.

TABLE 4

| Exp. No. | Component B | Temperature | α | M.I. |
|---|---|---|---|---|
| 1 | 0.4 TEA | 200° C. | 185 | — |
| 2 | 0.4 TIBA | 200° C. | 130 | — |
| 3 | 0.4 TEA/ROH | 200° C. | 160 | — |
| 4 | 0.4 TIBA | 240° C. | <50 | — |
| 5 | 0.4 TEA/ROH | 240° C. | <50 | — |

COMPARATIVE EXAMPLE 3

Component A was prepared by treating 9 mmol TBT, 9 mmol VOCl₃ and 27 mmol SEAC as in Comparative example 2. With 0.4 mmol DEALOX as component B and polymerization conditions as in Example II, the catalyst was not active.

COMPARATIVE EXAMPLE 4

Component A was prepared by treating 4.5 mmol TiCl₄, 4.5 mmol VB and 54 mmol SEAC as in Comparative example 2. The catalyst, with 0.4 mmol/l DEALOX as component B and polymerization conditions as in example II, was not active.

COMPARATIVE EXAMPLE 5

Component A was prepared by treating (2 mmol TBT+3 mmol VB+10 mmol BzCl) and 30 mmol SEAC as in Comparative example 2. With 0.4 mmol/l TEA as component B and polymerization conditions as in Example II, an acitivity of 341 was achieved.

COMPARATIVE EXAMPLE 6

Component A was prepared by dropwise addition to 12 mmol SEAC at 25° C. of a solution of 5 mmol TBT+5 mmol VOCl₃, which had been aged for 4 days. The resultant suspension was filtered off and the solid matter washed and dried. After this, 2.73 g of the solid was added to 1.58 g TiCl₄ in 10 ml hexane. The precipitate formed after 3 hours' reacting at 25° C. was recovered, washed, dried and resuspended.

Polymerization further was effected as in Example II, with such an amount of the suspension that the total concentration of transition metals was about 0.1 mmol/l. As component B use was made of 0.4 mmol/l TEA or 0.4 mmol/l DEALOX. In either case was the catalyst active.

COMPARATIVE EXAMPLE 7

Component A was prepared by reacting a titanium and a vanadium compound, as indicated in Table 5, in PMH at room temperature with DEAC. After mixing for 40 seconds at room temperature, the mixture was heated to 185° C. for 1.5 minutes and fed to the reactor. Subsequently TEA or DADS was fed to the reactor as component B, as indicated in table 5. Polymerization further was effected as in Example II.

TABLE 5

| Exp. No. | Component A | Component B | α | l/MI |
|---|---|---|---|---|
| 1 | 0.1 DEAC/(0.075 TiCl₄ + 0.025 VOCl₃) | 0.28 TEA | 450 | 0.45 |
| 2 | 0.1 DEAC/(0.04 TiCl₄ + 0.06 VOCl₃) | 0.28 TEA | 448 | 0.60 |
| 3 | 0.1 DEAC/(0.04 TiCl₄ + 0.06 VOCl₃) | 0.28 DADS | 239 | — |
| 4 | 0.1 DEAC/(0.075 TBT + 0.025 VOCl₃) | 0.28 TEA | <50 | — |
| 5 | 0.1 DEAC/(0.075 TBT + 0.025 VOCl₃) | 0.28 DADS | <50 | — |
| 6 | 0.1 DEAC/(0.075 TBT + 0.025 VB) | 0.28 TEA | <50 | — |
| 7 | 0.1 DEAC/(0.075 TBT + 0.025 VB) | 0.28 DADS | <50 | — |
| 8 | 0.6 SEAC/(0.04 TiCl₄ + 0.06 VOCl₃) | 0.2 TEA | 255 | 0.8 |
| 9 | 0.6 SEAC/(0.04 TiCl₄ + 0.06 VOCl₃) | 0.4 TEA | 352 | 0.5 |
| 10 | 0.6 SEAC/(0.04 TiCl₄ + 0.06 VOCl₃) | 0.3 DADS | 466 | 0.5 |

EXAMPLE III

Component A was prepared by mixing the ingredients listed in Table 6 at the temperatures shown in the same table. To this end, the PMH in which the ingredients were mixed was in advance brought at the indicated temperature. Otherwise the process of Example 1 was adhered to. As component B, 0.4 mmol/l DADS was used.

TABLE 6

| Exp. No. | Component A | temperature (°C.) | α |
|---|---|---|---|
| 1 | 0.6 SEAC/0.04 TBT/0.06 VB | 30 | 1284 |
| 2 | 0.6 SEAC/0.04 TBT/0.06 VB | 40 | 1100 |
| 3 | 0.6 SEAC/0.04 TBT/0.06 VB | 50 | 844 |
| 4 | 0.6 SEAC/0.04 TBT/0.06 VB | 60 | 838 |
| 5 | 0.6 SEAC/0.04 TBT/0.06 VB | 70 | 735 |

EXAMPLE IV

Using catalyst systems as listed in Table 7, ethylene-octene copolymerizations were effected as in Example I. Prior to the ethylene, 1-octene was fed to the reactor in the amounts (in ml) given in Table 7. The density of the polymer in kg/m³ was determined in accordance with ASTM D 1505.

TABLE 7

| Exp. No. | octene dose | COMPONENT A | COMPONENT B | α | d | M.I. |
|---|---|---|---|---|---|---|
| 1 | 30 | 0.7 SEAC/0.04 TBT/0.06 VB/0.2 BzCl | 0.4 TEA | 1051 | 941.2 | 5.7 |
| 2 | 35 | 0.7 SEAC/0.04 TBT/0.06 VB/0.2 BzCl | 0.4 DEALOX | 1189 | 935.8 | 5.0 |
| 3 | 30 | 0.7 SEAC/0.04 TBT/0.06 VB/0.2 SiCl₄ | 0.4 TEA | 1152 | 938.5 | 5.6 |
| 4 | 30 | 0.7 SEAC/0.04 TBT/0.06 VB/0.2 SiCl₄ | 0.4 DEALOX | 1239 | 935.2 | 6.8 |
| 5 | 75 | 0.7 SEAC/0.04 TBT/0.06 VB/0.2 BzCl | 0.4 DADS | 1142 | 925.0 | 6.8 |
| 6 | 30 | 0.7 SEAC/0.025 TBT/0.075 VB/0.2 BzCl | 0.4 DADS | 1249 | 931.6 | 7.9 |
| 7 | 50 | 0.7 SEAC/0.04 TBT/0.06 VB/0.2 BzCl | 0.4 DADS | 1212 | 924.0 | 8.2 |

TABLE 7-continued

| Exp. No. | octene dose | COMPONENT A | COMPONENT B | a | d | M.I. |
|---|---|---|---|---|---|---|
| 8 | 30 | 0.7 SEAC/0.04 TBT/0.06 VB/0.2 SiCl$_4$ | 0.4 TEA/0,2 EB | 1319 | 934.4 | 6.9 |

What is claimed is:

1. Catalyst system suitable for the (co)polymerization of ethylene and optionally minor amounts of 1-alkenes and/or dienes at a temperature of at least 180° C., to be prepared by combining at least two components, A and B, which components comprise:

A: one or more titanium compounds and one or more vanadium compounds, mixed with one or more organoaluminum compounds in such an amount that the atomic ratio of aluminum to the sum of titanium an vanadium is at least 3, B: one or more organoaluminum compounds, one or both of components A and B containing a chloride, and in which said two components are fed, separately or in combination, direct to the reaction vessel in such an amount that the atomic ratio of the chlorine from components A and/or B to the sum of titanium and vanadium of component A is at least 6.

2. The catalyst system according to claim 1 wherein the combination of component A and component B is obtained by separately introducing said component A and said component B into a reaction vessel.

3. The catalyst system according to claim 2, wherein:
the atomic ratio of aluminum from component B to the sum of titanium and vanadium is at least 3;
the atomic ratio of titanium to vanadium is lower than or equal to 1;
the titanium compound is a compound of the formula: Ti(OR$^1$)$_{4-n}$X$^1_n$ and/or Ti(OR$^2$)$_{3-m}$X$^2_m$, wherein in said formulas, the symbols R$^1$ and R$^2$ are equal or different and represent hydrocarbon residues having 1-20 carbon atoms, X$^1$ and X$^2$ represent halogen atoms, $0 \leq n \leq 4$ and $0 \leq m \leq 3$.

4. The catalyst system according to claim 2, wherein the vanadium compound is a compound of the formula: VX$^4_3$ or VX$^4_4$, wherein in said formulas X$^4$ represents a halogen atom.

5. The catalyst system according to claim 2, wherein:
the organoaluminum compound of said component A is a compound of the formula:
R$^4_q$AlX$_{3-q}$, wherein said formula the symbols R$^4$ are the same or different and represent a hydrocarbon residue having 1 to 20 carbon atoms, X represents a halogen atom and $0 \leq q \leq 3$;
the organoaluminum compound of said component B is a compound of the formula R$^5_s$AlY$_{3-s}$, wherein said formula the symbols R$^5$ are equal or different and represent a hydrocarbon residue having 1 to 20 carbon atoms,
Y represents a hydrogen atom, a hydrocarbon residue having 1 to 20 carbon atoms, a group of the general formula —NR$^6$ wherein R$^6$ is a hydrocarbon residue having 1-10 carbon atoms or a group of the general formula —OR$^7$ wherein
R$^7$ is a hydrocarbon residue having 1-20 carbon atoms or group of the general formula —Si(R$^8$)$_3$ wherein each R$^8$ is independent of one another, a hydrogen atom or a hydrocarbon residue having 1-20 carbon atoms, and $0 \leq s \leq 3$;

the atomic ratio of aluminum from component B to the sum of titanium and vanadium is at least 3; and the atomic ratio of titanium to vanadium is lower than or equal to 1.

6. The catalyst system according to claim 1, wherein the atomic ratio of aluminum from component A to the sum of titanium and vanadium is at least 5.

7. The catalyst system according to claim 1, wherein the atomic ratio of chlorine to the sum of titanium and vanadium is at least 7.5.

8. The catalyst system according to claim 1, wherein the atomic ratio of aluminum from component B to the sum of titanium and vanadium is at least 3.

9. The catalyst system according to claim 1, wherein the atomic ratio of titanium to vanadium is lower than or equal to 1.

10. The catalyst system according to claim 1 wherein the titanium compound is a compound having the formula:

Ti(OR$^1$)$_{4-n}$X$^1_n$, and/or

Ti(OR$^2$)$_{3-m}$X$^2_m$, wherein said formulas the symbols R$^1$ and R$^2$ are equal or different and represent hydrocarbon residues having 1-20 carbon atoms,
X$^1$ and X$^2$ represent halogen atoms, $0 \leq n \leq 4$; and $0 \leq m \leq 3$.

11. The catalyst system according to claim 10, wherein the titanium compound is a titanic acid ester.

12. The catalyst system according to claim 11, wherein the titanium compound is tetrabutoxytitanium.

13. The catalyst system according to claim 1, wherein the vanadium compound is a compound of the formula:

VO(OR$^3$)$_{3-p}$X$^3_p$, wherein in said formula
R$^3$ represents a hydrocarbon residue having 1-20 carbon items,
X$^3$ represents a halogen atom, and
$0 \leq p \leq 3$.

14. The catalyst system according to claim 13, wherein the titanium compound is vanadyl chloride, vanadyl butoxide, or a mixture of vanadyl chloride and vanadyl butoxide.

15. A catalyst system according to claim 1, wherein the vanadium compound is a compound of the formula:

VX$^4_3$ or VX$^4_4$, wherein in said formula X$^4$ represents a halogen atom.

16. The catalyst system according to claim 1, wherein at least half of the chloride atoms present originate from said component A.

17. The catalyst system according to claim 1 wherein said component A contains 1 or more chlorides.

18. The catalyst system according to claim 17 wherein said chlorides are alkyl-, acyl-, aryl-, and/or chlorides of elements of groups 3a and 4a of the Periodic Table.

19. The catalyst system according to claim 1, wherein said component A, said component B, or the combination of component A and said component B further comprise at least 1 or more electron donors.

20. The catalyst system according to claim 1, wherein the organoaluminum compound of said component A is a compound of the general formula:

$$R^4{}_q AlX_{3-q},$$

wherein in said formula the symbols $R^4$ are equal or different and represent a hydrocarbon residue having 1-20 carbon atoms, X represents a halogen atom, and $0 \leq q \leq 3$.

21. The catalyst system according to claim 20, wherein the organoaluminum compound of component A is (i) sesquiethylaluminum chloride, (ii) diethylaluminum chloride, or (iii) sesquiethylaluminum chloride and diethylaluminum chloride.

22. The catalyst system according to claim 1, wherein the organoaluminum compound of said component B is a compound of the formula;

$$R^5{}_s AlY_{3-s},$$

wherein in said formula the symbols $R^5$ are equal or different and represent a hydrocarbon residue having 1-20 carbon atoms, Y represents a hydrogen atom, a hydrocarbon residue having 1-20 carbon atoms, a group having the general formula $-NR^6$ wherein $R^6$ is a hydrocarbon residue having 1-10 carbon atoms or a group of the general formula $-OR^7$ wherein $R^7$ is a hydrocarbon residue having 1-20 carbon atoms or $R^7$ is a group having the formula $-Si(R^8)_3$ wherein each $R^8$ is, independently of one another, a hydrogen atom and/or a hydrocarbon residue having 1-20 carbon atoms, and $0 \leq s \leq 3$.

23. The catalyst system according to claim 22, wherein the organoaluminum compound of said component B contains at least one aluminum-oxygen bond.

24. The catalyst system according to claim 23, wherein the organoaluminum compound of said component B is dialkylaluminum alkoxide.

25. The catalyst system according to claim 1, wherein the organoaluminum compound of said component B is an alkylaluminoxane.

26. The catalyst system according to claim 1, wherein said component B contains one or more other metal alkyls in addition to the organoaluminum compound.

27. The catalyst system according to claim 1, wherein (1) in said component A:
    the titanium compound is a titanic acid ester,
    the vanadium compound is (i) vanadyl alkoxide, (ii) vanadyl halide, or (iii) a combination of vanadyl alkoxide and vanadyl halide,
    the organoaluminum compound is an alkylaluminum halide;

(2) in said component B:
    the organoaluminum compound contains at least one aluminum atom bound to an oxygen atom, and (3) a chloride is present, said chloride being introduced into the reaction vessel simultaneously with or prior to said component A.

28. The catalyst system according to claim 27, wherein
in said component A:
    the titanic acid ester is tetrabutoxytitanium,
    the vanadyl alkoxide is vanadyl butoxide,
    the vanadyl halide is vanadyl chloride,
    the alkyl aluminumhalide is diethylaluminum chloride, susquiethylaluminum chloride, or a combination of diethylaluminum chloride or susquiethylaluminum chloride; and
wherein in said component B:
    the organoaluminum compound is at least one of alkylaluminoxane, dialkylaluminum alkoxide, a mixture of an electron donor with a dialkylaluminum alkoxide, a mixture of an electron donor with alkylsiloxalane, a mixture of an electron doner and dialkylaluminum alkoxide and alkylsiloxalane and
    further wherein the chloride is a chloride of alkyl-, acyl-, aryl- and/or elements of groups 3a and 4a of the Periodic Table.

29. The process for preparing a catalyst system according to claim 1, comprising mixing said titanium and vanadium compounds with the organoaluminum compound at a temperature less than 125° C.

30. The process according to claim 29, wherein the titanium and vanadium compounds are mixed with the organoaluminum compound at a temperature below 75° C.

* * * * *